(12) United States Patent
Cavallaro et al.

(10) Patent No.: US 12,259,844 B2
(45) Date of Patent: Mar. 25, 2025

(54) MICROCONTROLLER AND CORRESPONDING METHOD OF OPERATION

(71) Applicants: STMicroelectronics S.r.l., Agrate Brianza (IT); STMicroelectronics Application GMBH, Aschheim-Dornach (DE)

(72) Inventors: Giuseppe Cavallaro, Catania (IT); Fred Rennig, Nandlstadt (DE)

(73) Assignees: STMicroelectronics Application GmbH, Aschheim-Dornach (DE); STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 17/829,902

(22) Filed: Jun. 1, 2022

(65) Prior Publication Data

US 2022/0398213 A1 Dec. 15, 2022

(30) Foreign Application Priority Data

Jun. 14, 2021 (IT) .......................... 102021000015488

(51) Int. Cl.
*G06F 13/42* (2006.01)
*G05B 19/042* (2006.01)
(Continued)

(52) U.S. Cl.
CPC ...... *G06F 13/4282* (2013.01); *G06F 11/1004* (2013.01)

(58) Field of Classification Search
CPC ............. G06F 13/4282; G06F 11/1004; G06F 13/4291; G06F 13/385; G06F 13/4068; G05B 19/0423
See application file for complete search history.

(56) References Cited

U.S. PATENT DOCUMENTS 4,907,225 A * 3/1990 Gulick ............... H04Q 11/0428
370/463
5,497,371 A * 3/1996 Ellis ........................ H04L 49/20
714/799
(Continued)

OTHER PUBLICATIONS

STMicroelectronics, "I2S emulation on DSPI," TN1296, Technical note, Jul. 31, 2019, 16 pages.
(Continued)

*Primary Examiner* — Idriss N Alrobaye
*Assistant Examiner* — Henry W Yu
(74) *Attorney, Agent, or Firm* — Slater Matsil, LLP

(57) ABSTRACT

In an embodiment a microcontroller includes a processing unit and a deserial-serial peripheral interface (DSPI) module, wherein the deserial-serial peripheral interface module is coupleable to a communication bus configured to operate according to a selected communication protocol, wherein the processing unit is configured to read user data intended for inclusion in an outgoing frame encoded according to the selected communication protocol, calculate, as a function of the user data, a cyclic redundancy check (CRC) value intended for inclusion in the outgoing frame, compose the outgoing frame by including the user data and the calculated CRC value into the outgoing frame, produce a DSPI frame encoded according to the selected communication protocol as a function of the outgoing frame and program a data register of the deserial-serial peripheral interface module with the DSPI frame, and wherein the deserial-serial peripheral interface module is configured to transmit the DSPI frame via the communication bus.

20 Claims, 5 Drawing Sheets

(51) Int. Cl.
*G06F 11/10* (2006.01)
*G06F 13/38* (2006.01)
*G06F 13/40* (2006.01)

(56) References Cited

U.S. PATENT DOCUMENTS

| | | | | |
|---|---|---|---|---|
| 6,467,039 | B1* | 10/2002 | Fredriksson | G05B 19/042 |
| | | | | 380/278 |
| 6,674,723 | B1* | 1/2004 | Joo | H04L 12/5602 |
| | | | | 370/236.1 |
| 8,897,319 | B2* | 11/2014 | Fredriksson | H04L 65/1101 |
| | | | | 370/464 |
| 2003/0058882 | A1* | 3/2003 | Fleury | H04L 12/403 |
| | | | | 370/445 |
| 2003/0093607 | A1* | 5/2003 | Main | G06F 13/4045 |
| | | | | 710/306 |
| 2004/0049624 | A1* | 3/2004 | Salmonsen | G06F 13/40 |
| | | | | 709/250 |
| 2005/0021874 | A1* | 1/2005 | Georgiou | G06F 15/167 |
| | | | | 709/250 |
| 2005/0047434 | A1* | 3/2005 | Hopkins | H04L 41/0604 |
| | | | | 370/466 |
| 2005/0165970 | A1* | 7/2005 | Ching | G06F 13/4072 |
| | | | | 710/1 |
| 2008/0219252 | A1* | 9/2008 | Narasimhaprasad | |
| | | | | H04L 12/2803 |
| | | | | 370/389 |
| 2010/0274934 | A1* | 10/2010 | Nakayama | G06F 13/4295 |
| | | | | 710/33 |
| 2014/0016654 | A1* | 1/2014 | Yakashiro | H04L 12/413 |
| | | | | 370/516 |
| 2016/0077984 | A1* | 3/2016 | Steinert | G06F 9/45558 |
| | | | | 710/309 |
| 2019/0213152 | A1 | 7/2019 | Jacobs | |

OTHER PUBLICATIONS

Barthel, Jochen, et al., "CAN FD Light—A novel communication bus supporting digitalization and customization of automotive lighting for the broad market", 2019 AEIT International Conference of Electrical and Electronic Technologies for Automotive, Jul. 2, 2019, 5 pages.

STMicroelectronics, "SPC58xNx32-bit Power Architecture microcontroller for automotive ASILD applications", RM0421 Reference manual, Rev 5, Jan. 31, 2021, 101 pages.

Wikipedia, "Cyclic redundancy check", retrieved from https://web.archive.org/web/20100210000750/https://en.wikipedia.org/wiki/Cyclic_redundancy_check, Feb. 10, 2010, 5 pages.

STMicroelectronics, "SPC58xNx32-bit Power Architecture microcontroller for automotive ASILD applications," RM0421, Jan. 2021, 101 pages.

ISO, "ISO/DIS 11898-1:2023," https://www.iso.org/store.html, Jan. 2023, 5 pages.

\* cited by examiner

MICROCONTROLLER AND CORRESPONDING METHOD OF OPERATION

CROSS-REFERENCE TO RELATED APPLICATIONS

This application claims the benefit of Italian Application No. 102021000015488, filed on Jun. 14, 2021, which application is hereby incorporated herein by reference.

TECHNICAL FIELD

The description relates to electronic communication in microcontrollers using a deserial-serial peripheral interface (DSPI).

BACKGROUND

Conventional microcontrollers may include one or more deserial-serial peripheral interface modules (e.g., DSPI controllers).

The microcontrollers available with companies of the STMicroelectronics group under the trade designations SPC58xNx are exemplary of such conventional microcontrollers, for use, e.g., in the automotive field. A detailed description of such microcontrollers is provided in the datasheet "SPC584Nx, SPC58ENx, SPC58NNx—32-bit Power Architecture microcontroller for automotive ASIL-D applications", DS11734 Rev 5, June 2019, and in the reference manual "SPC58xNx32-bit Power Architecture microcontroller for automotive ASIL-D applications", RM0421 Rev 5, January 2021, both publicly available online at st.com. In particular, section 7.8.4 (pages 240-242) and chapter 58 (pages 2707-2804) of the reference manual RM0421 cited above provide a detailed description of the operating principles of a deserial-serial peripheral interface in such microcontrollers.

In brief, a DSPI module can perform transfer of data using an enhanced direct memory access (eDMA) engine, and it supports the data serialization and data de-serialization features. A DSPI module may have three configurations.

A first configuration is the serial peripheral interface (SPI) configuration, where the DSPI module sends and receives serial data. The SPI configuration allows the DSPI module to operate as a basic SPI block with internal FIFOs supporting external queues operation. Transmit data and received data reside in separate FIFOs (first-in, first-out registers). The host CPU or a DMA controller of the microcontroller including the DSPI module read the received data from the receive FIFO and write transmit data to the transmit FIFO.

A second configuration is the enhanced deserial-serial interface (DSI) configuration, where the DSPI module serializes up to 64 parallel input signals or register bits. The DSPI module also deserializes the received data to parallel output signals or to a memory-mapped register. The data is transferred using an SPI-like protocol.

A third configuration is the combined serial interface (CSI) configuration, where the DSPI module supports a combination of SPI and DSI modes of operation. In a first (normal) mode of the CSI configuration, the DSPI module interleaves DSI data frames with SPI data frames. Interleaving is done on the frame boundaries. In a second mode of the CSI configuration (also called timed serial bus configuration, TSB), transmission of SPI data has higher priority than DSI data. In a third mode of the CSI configuration (also called interleaved timed serial bus configuration, ITSB), the frames from SPI and DSI are interleaved without priority. On every trigger, frames from DSI are sent when there are no frames in the SPI or the previous transmission was a frame from SPI.

The DSI configuration and the CSI configuration may be used for emulating a Microsecond Channel.

The DSPI serialization can get as input source some internal modules of the microcontroller, like generic timer module (GTM), enhanced modular input/output subsystem (eMIOS) and/or general purpose input/output (GPIO), and it also offers the alternate serialization data registers that can be written by the software and used as an alternate source of the serialized data.

Providing a high number of communication peripherals in a microcontroller, particularly in the automotive field, is a desirable feature. However, implementing native protocol controllers in a microcontroller may result in an undesired increase of cost.

Therefore, there is a need in the art to provide microcontrollers supporting an increasing range of communication protocols at a low cost.

SUMMARY

Embodiments provide improved microcontrollers which support certain communication protocols without implementing a respective (hardware) protocol controller.

Further embodiments may relate to a corresponding method of operation.

In one or more embodiments, a microcontroller may comprise a processing unit and a deserial-serial peripheral interface module. The deserial-serial peripheral interface module may be configured to be coupled to a communication bus which operates according to a selected communication protocol. The processing unit may be configured to read user data intended for inclusion in an outgoing frame encoded according to the selected communication protocol. The processing unit may be configured to calculate, as a function of the user data, a CRC value intended for inclusion in the outgoing frame. The processing unit may be configured to compose the outgoing frame including the user data and the calculated CRC value into the outgoing frame. The processing unit may be configured to produce a DSPI frame encoded according to the selected communication protocol as a function of the outgoing frame. The processing unit may be configured to program a data register of the deserial-serial peripheral interface module with the DSPI frame, so that operation of the deserial-serial peripheral interface module results in transmission of the DSPI frame via the communication bus.

In one or more embodiments, the processing unit may be configured to apply bit stuffing processing to the DSPI frame encoded according to the selected communication protocol.

In one or more embodiments, the deserial-serial peripheral interface module may comprise a pair of differential output pins configured to be coupled to the communication bus to drive the communication bus via differential DSPI signals.

In one or more embodiments, the deserial-serial peripheral interface module may be configured to be coupled to a transceiver circuit (e.g., a CAN transceiver) to provide to the transceiver circuit an output DSPI signal indicative of the DSPI frame encoded according to the selected communication protocol.

In one or more embodiments, the microcontroller may comprise an enhanced direct memory access engine. The enhanced direct memory access engine may be configured to read the user data and/or to program the data register of the deserial-serial peripheral interface module with the DSPI frame.

In one or more embodiments, the deserial-serial peripheral interface module may be configured to operate in a deserial serial interface (DSI) configuration.

In one or more embodiments, the deserial-serial peripheral interface module may be configured to operate in a combined serial interface (CSI) configuration, and the deserial-serial peripheral interface module may be configured to send a frame according to an SPI format interleaved with the DSPI frame transmitted via the communication bus.

In one or more embodiments, the frame according to an SPI format may comprise the DSPI frame programmed into the data register of the deserial-serial peripheral interface module.

In one or more embodiments, the selected communication protocol may be a CAN protocol, optionally a CAN FD Light protocol, or a LIN protocol, or a FlexRAY protocol, or a DSI3 protocol.

In one or more embodiments, a method of operating a microcontroller according to one or more embodiments may comprise reading user data intended for inclusion in an outgoing frame encoded according to the selected communication protocol. The method may comprise calculating, as a function of the user data, a CRC value intended for inclusion in the outgoing frame. The method may comprise composing the outgoing frame including the user data and the calculated CRC value into the outgoing frame. The method may comprise producing a DSPI frame encoded according to the selected communication protocol as a function of the outgoing frame. The method may comprise programming a data register of the deserial-serial peripheral interface module with the DSPI frame, so that operation of the deserial-serial peripheral interface module results in transmission of the DSPI frame via the communication bus.

One or more embodiments may thus facilitate emulating a certain communication protocol in a microcontroller using a low-cost communication peripheral, without relying on dedicated hardware components.

BRIEF DESCRIPTION OF THE DRAWINGS

One or more embodiments will now be described, by way of example only, with reference to the annexed figures, wherein.

DETAILED DESCRIPTION OF ILLUSTRATIVE EMBODIMENTS

Figure 1:
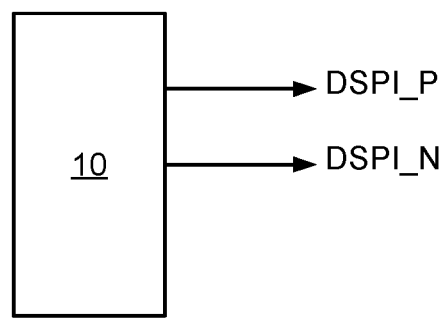
FIG. 1 is a circuit block diagram exemplary of a DSPI module for use in one or more embodiments of the present description.

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular configurations, structures, or characteristics may be combined in any adequate way in one or more embodiments.

The headings/references used herein are provided merely for convenience and hence do not define the extent of protection or the scope of the embodiments.

Throughout the figures annexed herein, unless the context indicates otherwise, like parts or elements are indicated with like references/numerals and a corresponding description will not be repeated for brevity.

As previously discussed, providing communication peripherals for certain communication protocols in a microcontroller is a desirable feature. In particular, in the automotive field, the CAN FD Light protocol has been recently developed. It is desirable to provide microcontrollers able to communicate using the CAN FD Light protocol, without implementing a native CAN controller so as to reduce the cost of the device.

Therefore, one or more embodiments relate to a microcontroller using a low-cost communication peripheral, particularly a DSPI module, to emulate a CAN FD Light protocol controller without relying on dedicated hardware components.

In particular, the DSI configuration of a DSPI module may fit the functionality of a master device according to the CAN FD Light protocol, where no bus arbitration phase is used (in contrast to the standard CAN communication protocol). In recent generations of (automotive) microcontrollers, the DSPI modules are conventionally embedded mainly as a backup solution, because their functionality has been replaced by other (e.g., newer) peripherals, such as the SPIq. Therefore, a DSPI module may conveniently be dedicated to emulation of a CAN FD Light protocol controller, without loss of functionality of the microcontroller device.

Additionally, a DSPI module can use the eDMA to quickly transfer data between a main memory of the microcontroller and other peripherals, without the intervention of the CPU. Such a feature is not available on other IP (Intellectual Property) blocks, such as the native CAN controllers.

A DSPI module provides a synchronous serial bus for communication between a microcontroller and one or more external peripheral devices. In the DSI configuration, the DSPI module serializes up to 64 parallel input signals or register bits. The DSPI module also deserializes the received data to parallel output signals or to a memory mapped register. According to one or more embodiments, a DSPI module operating in DSI mode is therefore suitable to emulate the master CAN FD Light frame transmission. A CAN FD Light frame may include: a Standard Identifier field, a Fixed Control Bits field, a Data Length Code (DLC) field, a Data Bytes ("Payload") field, a Cyclic Redundancy Check (CRC) field, and an Acknowledge field. The CRC field may contain also the stuff bit count and its parity. The CRC value is calculated and added after the stuff bits have been inserted into the frame. The CRC value conforms to a certain (e.g., dedicated) stuffing rule according to which fixed stuff bits are inserted, as described, for instance, in the standard ISO 11898-1:2015.

FIG. 1 is a block diagram exemplary of one or more embodiments, where the physical layer for the CAN FD Light connections is implemented using the DSPI differential signals DSPI_P and DSPI_N provided by the DSPI module 10, without the use of a transceiver.

Figure 2:
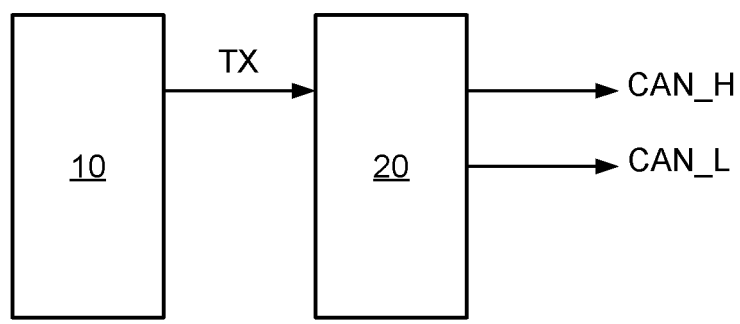
FIG. 2 is another circuit block diagram exemplary of a DSPI module for use in one or more embodiments of the present description.

Alternatively, in one or more embodiments as exemplified in FIG. 2, the DSPI module 10 may transmit a transmission signal TX to a physical CAN transceiver 20, which drives the differential CAN signals CAN_H and CAN_L to transmit the emulated frame.

Figure 3:
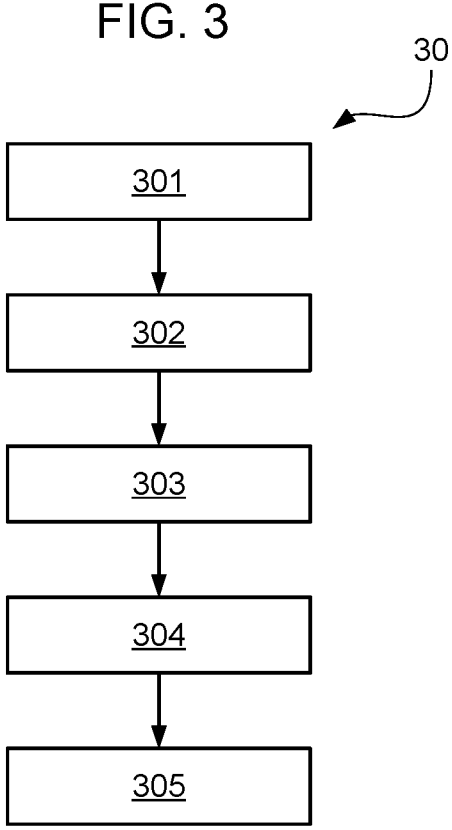
FIG. 3 is a block diagram exemplary of a procedure for generating frames according to a CAN FD Light protocol according to one or more embodiments of the present description.

FIG. 3 is a high level block diagram exemplary of a procedure 30 (e.g., a software procedure) implemented in one or more embodiments to generate emulated CAN FD Light master frames by an otherwise conventional DSPI hardware (e.g., one or more DSPI modules) provided in a microcontroller.

Before executing the procedure 30, the DSPI module is initialized in the DSI operation mode. As exemplified in FIG. 3, the procedure 30 comprises a step 301 where an application (e.g., run in a processing unit of the microcontroller) parses the user data to build a DSPI DSI frame emulating a CAN FD Light frame. In a subsequent step 302, the application calculates a CRC value of the frame. In a subsequent step 303, the DSPI DSI frame is built using the user data and the computed CRC value. In a subsequent step 304, the bit stuffing is inserted into the DSPI DSI frame, if necessary. In a last step 305 of the procedure 30, the DSPI data registers are programmed so that operation of the DSPI module emulates the transmission of the CAN FD Light frame. Therefore, the DSPI module generates the DSPI DSI frame starting from the user parameters defined for the CAN FD Light message.

It is noted that the approach described with reference to FIGS. 1 to 3 is applicable to any type of emulated frames which can be sent by a DSPI module. Reference to the emulation of CAN FD Light frames should therefore be understood as purely exemplary and not limiting the embodiments of the present description.

Figure 4:
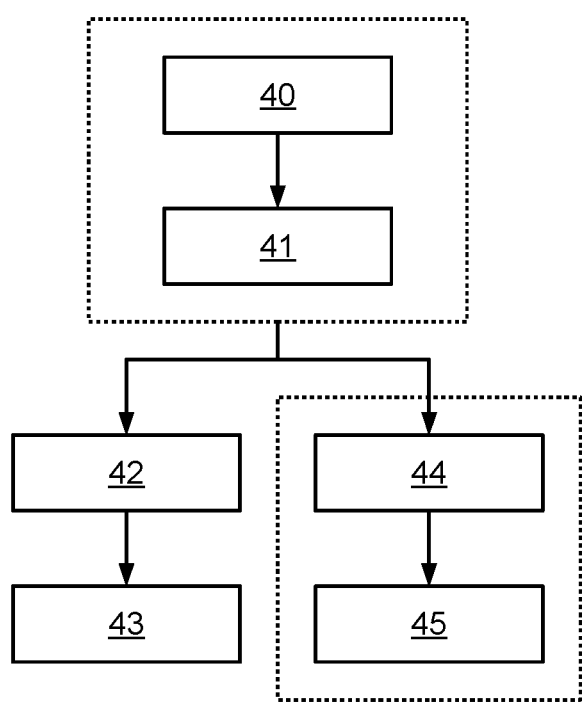
FIG. 4 is a block diagram exemplary of operating principles of one or more embodiments of the present description.

FIG. 4 is a high level block diagram exemplary of a general view of an application running in a microcontroller according to one or more embodiments. As exemplified in FIG. 4, a high level software application 40 can use similarly the API (e.g., socket layer 41) to send frames on real CAN protocols (e.g., using a low level CAN driver 42 and a conventional CAN physical layer 43) and/or on emulated CAN protocols (e.g., using a DSPI module 44 to emulate CAN FD Light frames and transmitting the emulated frames via a CAN transceiver or directly via the DSPI differential signals, 45).

Figure 5:
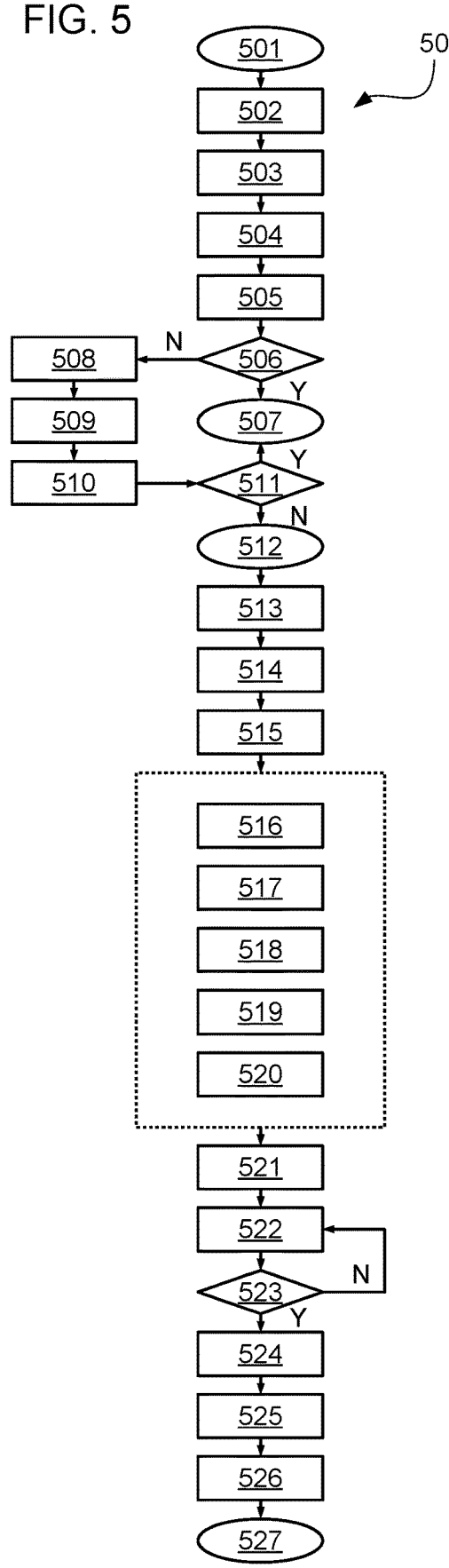
FIG. 5 is a flow diagram exemplary of a procedure for emulating CAN FD Light frames via a DSPI interface according to one or more embodiments of the present description.

FIG. 5 is a flow diagram exemplary of a procedure 50 (e.g., a software procedure) as implemented in one or more embodiments to emulate CAN FD Light frames via a DSPI interface.

As exemplified in FIG. 5, the procedure 50 is started at a step 501 by an application run by the microcontroller. In a step 502, the microcontroller is set up (e.g., clock/PAD/IRQ). In a step 503, the DSPI module is initialized. In a step 504, the DSPI module is set into the DSI configuration. In a step 505, the clock and the pre-scaler of the DSPI module are set according to a desired transmission bit rate. In a step 506, it is checked whether an error has occurred. For instance, since it is expected that the DSPI controller is properly configured, the DSPI Module Configuration Register should have an expected configuration and the clock enable it configured. In one or more embodiments, checking such a configuration may be required before starting any transaction over the peripheral. In case an error is detected at step 506 (outcome Y of step 506), the procedure is terminated (exit) with an error state at a step 507. In case an error is not detected at step 506 (outcome N of step 506), the user parameters defining the content of the frame are parsed at a step 508. In a step 509, the ID is checked: the CAN ID field passed by the application high layer is verified in order to make sure that it corresponds to an expected CAN FD light identifier (e.g., via a software check). In a step 510, the message buffer is retrieved: this is the data passed from the application, which will be parsed to be part of the emulated CAN FD light message inside the DSPI register. In a step 511, it is checked whether an error has occurred (e.g., it is checked whether the message buffer is NULL or too big). In case an error is detected at step 511 (outcome Y of step 511), the procedure is terminated (exit) with an error state at step 507. In case an error is not detected at step 511 (outcome N of step 511), the protocol translator is started at a step 512. In a step 513, a CRC value of the frame is calculated. In a step 514, a CAN FD Light frame is built as a function of the parsed user data and computed CRC value. In a step 515, the LSB and MSB of the 64 bit of data are prepared: the CAN FD Light frame may be split in two parts, because it will be programmed in two registers of the DSPI (MSB for most significant bit, and LSB for the least significant bit). The raw buffer passed by the application has to be modified to emulate a CAN FD Light frame. The steps 516 to 520 include the operations for preparing the "real" frame. For instance, these steps include the operations of adding the start-of-frame (SOF) at the beginning, adding the program ID, adding the Ro and data length, adding the data, and adding the end-of-frame (EOF) at the end. In a step 521, an algorithm for introducing the bit stuffing is started. In a step 522, the generated frame is checked in search of a sequence comprising five consecutive '1' values and five consecutive '0' values. In a step 523, it is checked whether such a sequence has been found (outcome Y) or not (outcome N). If the sequence has not been found, the procedure returns to step 522. If the sequence has been found, the stuffing bits are added to the frame in a step 524. In a step 525, the frame is updated (e.g., the CRC value is calculated and added at the end of the frame building process, after the stuff bits have been inserted). In a frame 526, the ADSR registers (DSPI DSI—Alternate Serialization Data Register) are programmed. The procedure 50 terminates at an exit step 527.

Figure 6:
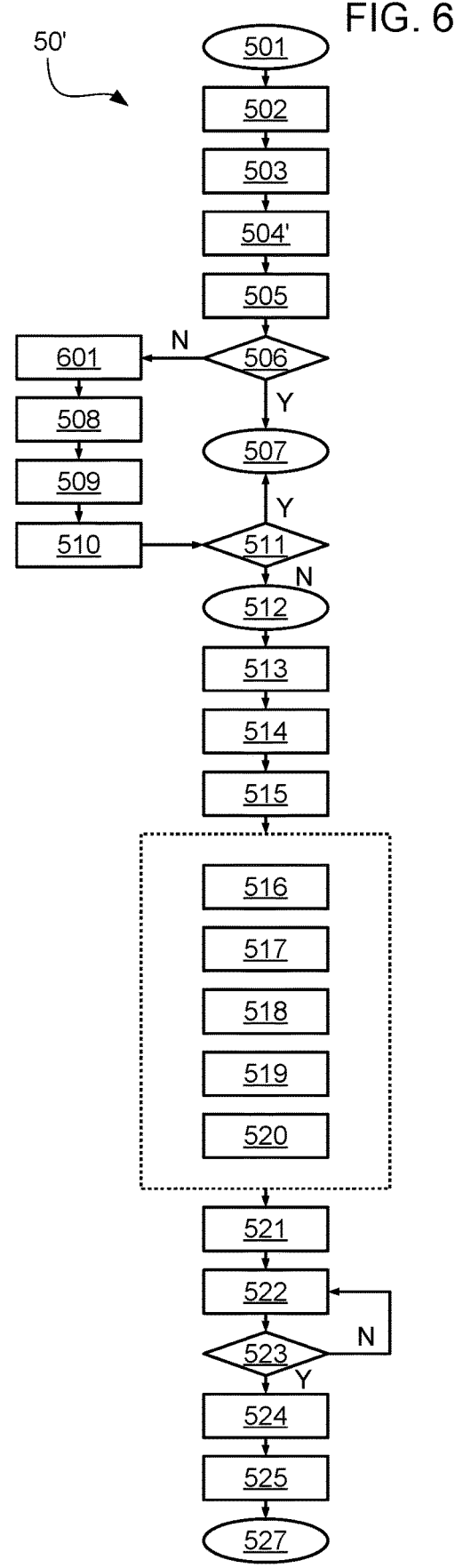
FIG. 6 is a flow diagram exemplary of another procedure for emulating CAN FD Light frames via a DSPI interface according to one or more embodiments of the present description.

FIG. 6 is a flow diagram exemplary of a variant 50' of the procedure 50 exemplified in FIG. 5, according to one or more embodiments where the DSPI module uses the eDMA. In the flow diagram of FIG. 6, the same reference numerals are used as in FIG. 5 to indicate the same steps of the procedure.

As exemplified in FIG. 6, the procedure 50' differs from the procedure 50 in that step 504 is substituted by step 504', where the DSPI module is set into the DSI configuration and the DMA is enabled.

The procedure 50' differs from the procedure 50 also in that after step 506 and before step 508, a further step 601 is inserted, where the eDMA is configured and the MUX is configured. According to the device reference manual previously cited, the Enhanced Direct Memory Access (eDMA) has to be programmed and configured to be used by a peripheral. This means that own DMA MUX has to be programmed and, for example, destination and source addresses must be defined to move the data by using this engine (e.g., dst=reg, src=frame).

The procedure 50' differs from the procedure 50 also in that step 526 is not performed between steps 525 and 527: the DSPI register is updated by the DMA. Notification can be carried out through the related IRQ service routine (if installed) or in polling mode. An event can be notified to the software by using interrupt or polling (with a timer) the status of the controller.

In one or more embodiments, the protocol translator (or emulator) produces, starting from the user input parameters (e.g., a CAN message), the DSPI frames that have to be programmed into the DSPI asynchronous registers, e.g., as discussed with reference to steps 512 to 525 of FIGS. 5 and 6. For instance, Table I (annexed at the end of the description) shows an example of the result of the register programming made during the procedure 50 or 50' before adding the stuffing bits. In the example of Table I, it is supposed that Id is OX12 so that ID1 and ID4 are 1 and that data length is 3. Data is OX67.

As previously discussed with reference to FIGS. 5 and 6, when the frame has been manipulated to be serialized by the DSPI operating in DSI mode, an algorithm reworks the frame in order to add the bit stuffing, if needed to complete the CAN FD Light frame (see, e.g., step 521 in the procedures 50 and 50'). As per CAN standard, more than five consecutive bits of the same polarity in CAN frame between the Start of Frame (SOF) and the CRC field is considered as a faulty frame on CAN bus, and it is signaled as stuff error on the CAN line. In one or more embodiments, in order to counter such transmitter errors, a bit of opposite polarity after every five consecutive bit may be inserted.

Figure 7:
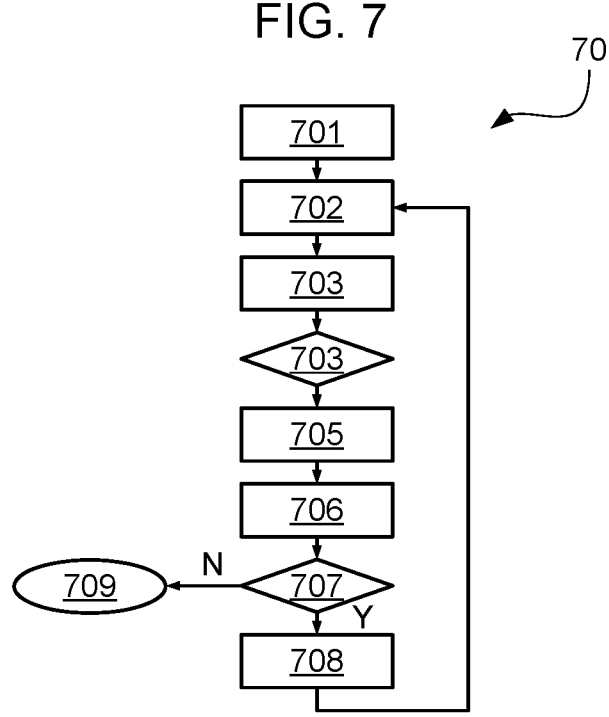
FIG. 7 is a flow diagram exemplary of a procedure for adding stuffing bits to an emulated CAN FD Light frame in one or more embodiments of the present description.

FIG. 7 is a flow diagram exemplary of a simplified version of a procedure 70 (e.g., a software algorithm) implemented in one or more embodiments to add the stuffing bits. The bit stuff field is read and if it is equal to 1 it is saved in a bitmap. Also the frame (LSB and MSB) that needs to be manipulated is saved in temporary variables. Then, the software tries to correct the entire bit stuffing so that the frame will not include any group of five consecutive bits with the same polarity (value).

As exemplified in FIG. 7, the bit stuffing procedure 70 may comprise a step 701 where the bit stuffing is set to '1'. In a step 702, the frame Low and High are saved. In a step 703, a bit temporary map array is cleared. In a step 704, a 5-cycle loop is performed. In a step 705, the bit stuffing is checked and possibly corrected. In a step 706, the frame is saved in the bit map. In a step 707, it is checked whether a next cycle has to be performed of not. If another cycle has to be performed (outcome Y of step 707), the bit stuffing is set to '0' in a step 708 and the procedure 70 returns to step 702. If no additional cycle has to be performed (outcome N of step 707), the bit stuffing procedure 70 terminates at an exit step 709. Calculation of a CRC value is done after the bit stuffing procedure.

Figure 8:
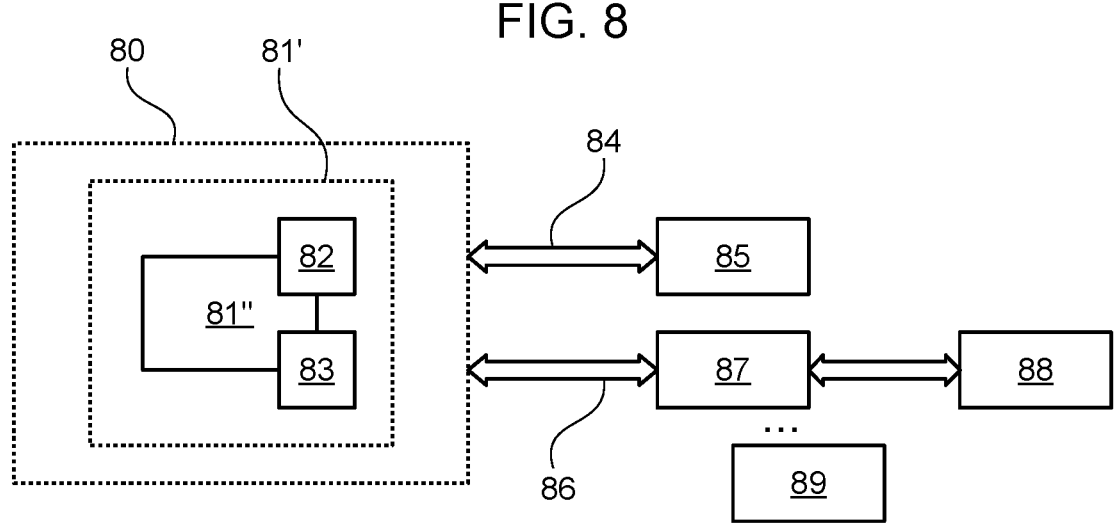
FIG. 8 is a block diagram exemplary of operation of a DSPI module in one or more embodiments of the present description.

As previously discussed, in one or more embodiments the DSPI module may support the combined serial interface (CSI) configuration, which allows interleaving of DSI data frames with SPI data frames from the transmission (TX) FIFO. Therefore, in one or more embodiments as exemplified in FIG. 8, a CAN FD Light master device 80 (e.g., a microcontroller) may comprise a DSPI module 81' including DSPI software 81" having a DSI functionality 82 and an SPI functionality 83. While the DSI 82 operates to emulate a CAN FD Light protocol and sends emulated CAN FD Light frames via a CAN FD Light bus 84 to a CAN FD Light network 85, an SPI frame can be sent via an SPI bus 86 for a different purpose, e.g., to drive further devices such as an external CAN module 87 with an SPI interface. This feature may be used to address (e.g., transmit) frames to another CAN network chain 88 (e.g., a CAN FD Light network or a standard CAN network), possibly extending the network topology. According to another example, in one or more embodiments this feature may be used to address (e.g., transmit) frames to an Ethernet network, e.g., a 10 Mbps Ethernet network.

Additionally or alternatively, the DSPI DSI Transmit Comparison Registers (COMPRx), that represent the outgoing DSI frame, can be directly transferred as SPI frames (possibly using a DMA channel). Another device 89 (e.g., a microcontroller unit) may check or manipulate this data to implement further safety mechanisms, thereby providing an additional means to monitor, verify and/or log the content of the frames sent by the master CAN FD Light device 80 via the DSPI module on the bus.

Figure 9:
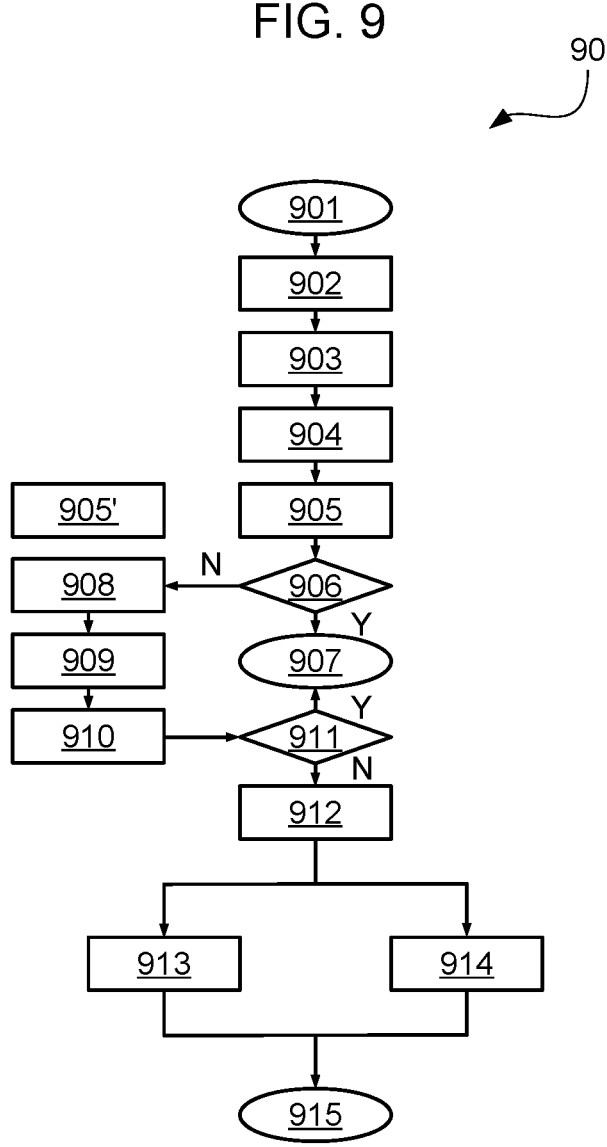
FIG. 9 is a flow diagram exemplary of a procedure for emulating CAN FD Light frames via a DSPI interface operating in the CSI configuration according to one or more embodiments of the present description.

FIG. 9 is a flow diagram exemplary of a procedure 90 (e.g., a software procedure) as implemented in one or more embodiments to emulate CAN FD Light frames over a DSPI interface operating in the CSI configuration.

As exemplified in FIG. 9, the procedure 90 is started at a step 901 by an application run by the microcontroller. In a step 902, the microcontroller is set up (e.g., clock/PAD/IRQ). In a step 903, the DSPI module is initialized. In a step 904, the DSPI module is set into the CSI configuration. In a step 905, the clock and the pre-scaler of the DSPI module are set according to the desired transmission bit rate. Concurrently, the eDMA may be set up in a step 905'. In a step 906, it is checked whether an error has occurred. In case an error is detected at step 906 (outcome Y of step 906), the procedure is terminated (exit) with an error state at a step 907. In case an error is not detected at step 906 (outcome N of step 906), the user parameters defining the content of the frame are parsed at a step 908. In a step 909, the ID is checked. In a step 910, the message buffer is retrieved. In a step 911, it is checked whether an error has occurred. In case an error is detected at step 911 (outcome Y of step 911), the procedure is terminated (exit) with an error state at step 907. In case an error is not detected at step 911 (outcome N of step 911), the DSI frame is prepared and sent (step 912) according to the procedure 50 (without using the DMA) or the procedure 50' (using the DMA) previously discussed with reference to FIGS. 5 and 6. After the DSI frame is prepared and sent, the procedure 90 may continue either with step 913, where a custom SPI frame is prepared and sent (with or without using the DMA), or with step 914, where the content of the CMPRx register is sent via an SPI frame (with or without using the DMA). The procedure 90 terminates at an exit step 915.

Therefore, one or more embodiments relate to the use of the DSPI serialization mode in a microcontroller to support the implementation of automotive protocols. While emulation of the CAN FD Light protocol has been exemplified in the present description, one or more embodiments may apply to emulation of other protocols, such as LIN, FlexRAY, DSI3. The asynchronous DSI mode of the DSPI module may be used to generate the frames for the CAN FD Light master. In the particular case of the CAN FD Light protocol, avoiding the use of native CAN instances available in the microcontroller is a desirable feature, so that emulating the CAN FD Light instance with a DSPI module is advantageous (e.g., because the cost of the device is reduced). Additionally, using the DSPI module allows using the eDMA, thereby improving the communication speed, e.g., up to 25 Mbps.

In one or more embodiments, the flexible data mode may not be supported, and the size may be limited to 64 bytes.

One or more embodiments may thus provide one or more of the following advantages:
- low-cost solution to implement basic features of communication devices in a microcontroller;
- implementation of a CAN FD Light bus without using native CAN controllers;
- cost saving due to reuse of existent hardware (differential signals availability); and
- increased communication speed (e.g., up to 25 Mbps) due to the use of the DSPI module in DSI mode.

Without prejudice to the underlying principles, the details and embodiments may vary, even significantly, with respect to what has been described by way of example only, without departing from the extent of protection.

The extent of protection is determined by the annexed claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A microcontroller comprising:
a processing unit; and
a deserial-serial peripheral interface (DSPI) module,
wherein the DSPI module is coupleable to a communication bus configured to operate according to a selected communication protocol,
wherein the communication bus is external to the microcontroller,
wherein the processing unit is configured to:
  read user data intended for inclusion in an outgoing frame encoded according to the selected communication protocol;
  calculate, as a function of the user data, a cyclic redundancy check (CRC) value intended for inclusion in the outgoing frame;
  compose the outgoing frame by including the user data and the calculated CRC value into the outgoing frame;
  produce a DSPI frame encoded according to the selected communication protocol as a function of the outgoing frame; and
  program a data register of the DSPI module with the DSPI frame, and
wherein the DSPI module is configured to transmit the DSPI frame via the communication bus.

2. The microcontroller of claim 1, wherein the processing unit is configured to apply bit stuffing processing to the DSPI frame encoded according to the selected communication protocol.

3. The microcontroller of claim 1, wherein the DSPI module comprises a pair of differential output pins coupleable to the communication bus and configured to drive the communication bus via differential DSPI signals.

4. The microcontroller of claim 1, wherein the DSPI module is coupleable to a transceiver circuit and configured to provide to the transceiver circuit an output DSPI signal indicative of the DSPI frame encoded according to the selected communication protocol.

5. The microcontroller of claim 1, further comprising an enhanced direct memory access engine, wherein the enhanced direct memory access engine is configured to read the user data.

TABLE I

| LSB | | | | | | | | | | | | | | |
|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 |
| SOF | ID10 | ID9 | ID8 | ID7 | ID6 | ID5 | ID4 | ID3 | ID2 | ID1 | ID0 | Req | IDext | Resv |
| 0 | 0 | 0 | 0 | 0 | 0 | 0 | 1 | 0 | 0 | 1 | 0 | 0 | 0 | 0 |
| 15 | 16 | 17 | 18 | | | | | | | | | | | |
| DL3 | DL2 | DL1 | DL0 | | | | | | | | | | | |
| 0 | 0 | 0 | 1 | | | | | | | | | | | |
| 19 | 20 | 21 | 22 | 23 | 24 | 25 | 26 | 27 | 28 | 29 | 30 | 31 | | |
| d7 | d6 | d5 | d4 | d3 | d2 | d1 | d0 | crc14 | c13 | c12 | c11 | c10 | | |
| 0 | 1 | 1 | 0 | 0 | 1 | 1 | 1 | | | | | | | |

| MSB | | | | | | | | | | | | | | | |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |
| c9 | c8 | c7 | c6 | c5 | c4 | c3 | c2 | c1 | c0 | del | 1 | 1 | 1 | 1 | 1 |
| 16 | 17 | 18 | 19 | 20 | 21 | 22 | | | | | | | | | |
| 1 | 1 | | | | | | | | | | | | | | |

6. The microcontroller of claim 1, further comprising an enhanced direct memory access engine, wherein the enhanced direct memory access engine is configured to program the data register of the DSPI module with the DSPI frame.

7. The microcontroller of claim 1, further comprising an enhanced direct memory access engine, wherein the enhanced direct memory access engine is configured to read the user data and to program the data register of the DSPI module with the DSPI frame.

8. The microcontroller of claim 1, wherein the DSPI module is configured to operate in a deserial-serial interface configuration.

9. The microcontroller of claim 1, wherein the DSPI module is configured to operate in a combined serial interface configuration, and wherein the DSPI module is configured to send a frame according to a serial peripheral interface (SPI) format interleaved with the DSPI frame transmitted via the communication bus.

10. The microcontroller of claim 9, wherein the frame according to the SPI format comprises the DSPI frame programmed into the data register of the DSPI module.

11. The microcontroller of claim 1, wherein the selected communication protocol is a controller area network (CAN) protocol.

12. The microcontroller of claim 11, wherein the CAN protocol is a CAN FD Light protocol, or a LIN protocol, or a FlexRAY protocol, or a DSI3 protocol.

13. A method for operating a microcontroller comprising a processing unit and a deserial-serial peripheral interface (DSPI) module, the method comprising:
   reading, by the processing unit, user data intended for inclusion in an outgoing frame encoded according to a selected communication protocol;
   calculating, by the processing unit, as a function of the user data, a cyclic redundancy check (CRC) value intended for inclusion in the outgoing frame;
   composing, by the processing unit, the outgoing frame including the user data and the calculated CRC value into the outgoing frame;
   producing, by the processing unit, a DSPI frame encoded according to the selected communication protocol as a function of the outgoing frame;
   programming, by the processing unit, a data register of the DSPI module with the DSPI frame; and
   transmitting, by the DSPI module, the DSPI frame via a communication bus.

14. The method of claim 13, further comprising, applying, by the processing unit, bit stuffing to the DSPI frame encoded according to the selected communication protocol.

15. The method of claim 13, further comprising driving, by the DSPI module the communication bus via differential DSPI signals.

16. The method of claim 13, further comprising:
   reading, by an enhanced direct memory access engine, the user data from the data register of the DSPI module; and
   programming, by the enhanced direct memory access engine, the data register of the DSPI module with the DSPI frame.

17. The method of claim 13, further comprising sending, by the DSPI module, a frame according to a serial peripheral interface (SPI) format interleaved with the DSPI frame transmitted via the communication bus.

18. The method of claim 13, wherein the frame according to a SPI format comprises the DSPI frame programmed into the data register of the DSPI module.

19. The method of claim 13, wherein the selected communication protocol is a controller area network (CAN) protocol.

20. The method of claim 19, wherein the CAN protocol is a CAN FD Light protocol, or a LIN protocol, or a FlexRAY protocol, or a DSI3 protocol.

* * * * *